(12) United States Patent
Crucianelli

(10) Patent No.: US 10,966,367 B2
(45) Date of Patent: Apr. 6, 2021

(54) AGRICULTURAL MACHINES WITH IMPROVED FOLDABILITY OF ITS LATERAL FRAMES

(71) Applicants: TALLERES METALURGICOS CRUCIANELLI S.A., Santa Fé (AR); CRUCIANELLI MAQUINAS AGRICOLAS DO BRASIL COMÉRCIO, IMPORTAçÃO E EXPORTAçÃO LTDA., Passo Fundo (AR)

(72) Inventor: Gustavo Crucianelli, Armstrong (AR)

(73) Assignees: TALLERES METALURGICOS CRUCIANELLI S.A., Armstrong (AR); CRUCIANELLI MAQUINAS AGRICOLAS DO BRASIL COMÉRCIO, IMPORTAÂO E EXPORTAÂO LTDA.., Passo Fundo (AR)

( * ) Notice: Subject to any disclaimer, the term of this patent is extended or adjusted under 35 U.S.C. 154(b) by 48 days.

(21) Appl. No.: 16/315,392

(22) PCT Filed: May 31, 2017

(86) PCT No.: PCT/BR2017/000058
§ 371 (c)(1),
(2) Date: Jan. 4, 2019

(87) PCT Pub. No.: WO2017/205950
PCT Pub. Date: Dec. 7, 2017

(65) Prior Publication Data
US 2019/0239415 A1    Aug. 8, 2019

(30) Foreign Application Priority Data

May 31, 2016 (AR) ............................... 20160101584

(51) Int. Cl.
*A01B 73/06* (2006.01)

(52) U.S. Cl.
CPC ............ *A01B 73/065* (2013.01); *A01B 73/06* (2013.01)

(58) Field of Classification Search
CPC ............................. A01B 73/065; A01B 73/06
See application file for complete search history.

(56) References Cited

U.S. PATENT DOCUMENTS

| | | | | |
|---|---|---|---|---|
| 4,504,076 A | * | 3/1985 | Bedney | ................ A01B 73/065 172/311 |
| 2013/0233580 A1 | * | 9/2013 | Kinzenbaw | .......... A01B 73/065 172/1 |

* cited by examiner

*Primary Examiner* — Tara Mayo-Pinnock
(74) *Attorney, Agent, or Firm* — Bond, Schoeneck & King, PLLC; Blaine Bettinger

(57) ABSTRACT

An agricultural machine with lateral folding frames and a central frame having plates linking same to a fixed tongue placed on the machine's longitudinal symmetry axis. Attached to the plate are articulated arms. Each free end of an articulated arm is connected to its respective lateral side frame, and on each arm is articulated a respective hydraulic piston whose other end is articulated to a telescopically displaceable tongue section. The containers or hoppers are arranged on the support area provided by the running gear linked to the central frame and a portion of the fixed tongue. The hydraulic pistons achieve the folding of the lateral frames to a travel disposition, offering the machine in its folded condition a minimum width less than 4 meters, compatible with the road travel regulations.

12 Claims, 11 Drawing Sheets

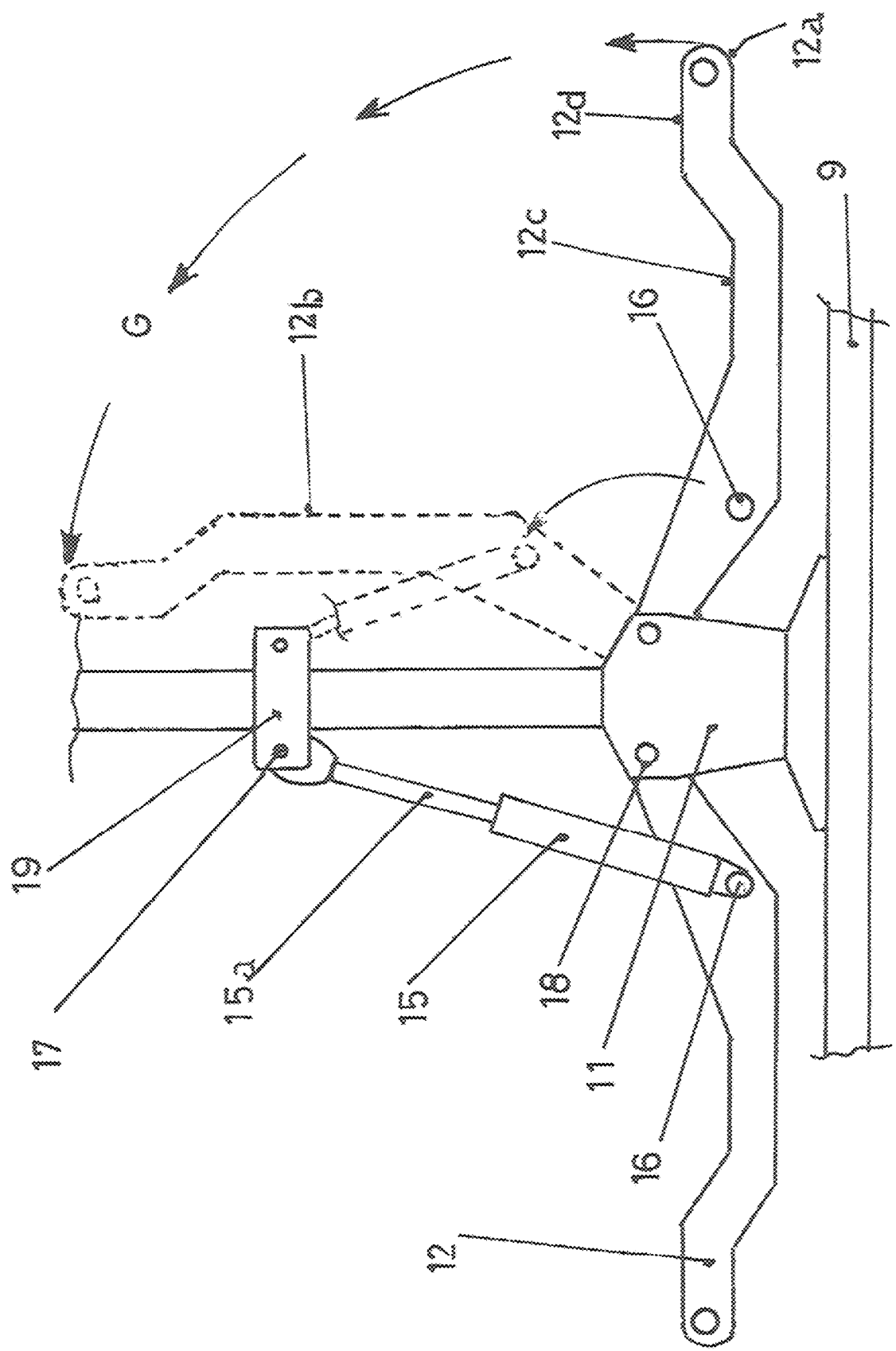

AGRICULTURAL MACHINES WITH IMPROVED FOLDABILITY OF ITS LATERAL FRAMES

CROSS-REFERENCE TO RELATED APPLICATIONS

This application claims priority to PCT Application No. PCT/BR2017/000058 filed on May 31, 2017, which claims priority to Argentine Patent Application Sn° P2016 01 001584 filed on May 31, 2016, the entire disclosure of each of which is incorporated herein by reference.

FIELD OF APPLICATION OF THE PRESENT INVENTION

The present invention relates to improvements introduced in the folding and the folding means applied to the lateral frames of agricultural machinery.

More specifically, this instant invention is applicable to all agricultural machinery having an intermediate central frame and at least one section of a lateral frame articulated at each end of the intermediate central frame.

NOMENCLATURE AND MEANING GIVEN TO THE TERMS AS USED IN THIS INSTANT SPECIFICATIONS AND CLAIMS

The following terms as hereby used, have the following meaning:

FOLDING and FOLDABILTY: By this term it is to be understood the action by means of which a lateral section of the frame of the agricultural machine is angularly displaced in a substantially horizontal plane, from a working condition in which said lateral frames are substantially aligned with the central frame, to a travel condition in which said folding lateral frames are placed perpendicular to said central frame.

FRAMES: This term designates the structure of the agricultural machine carrying the seeds planters, the furrow openers, seed dispensers, and other related piece of equipment.

CONTAINER: this term explains any container or hopper carried by the agricultural machinery within which it is possible to store any agrochemical, and seeds such as liquids, fertilizers, etc.

SEED AND FERTILIZER DEPOSITION DEVICES: This term identifies all means of distribution and deposit in the soil of seeds and/or fertilizers from said containers.

WHEEL TRAIN; It identifies the wheels and suspension of the agricultural machine same on which it sits, bearing frames of the agricultural machine.

PRIOR ART AND ANTECEDENTS OF THIS INSTANT INVENTION

Agricultural machines with collapsible or articulated frames are known in the art. These frame folding devices are a necessity since in many constructions of agricultural machines, such as seeders, when in their operative configuration, said frames are placed perpendicular to the direction of travel with a working length that spans 10 meters or more. However, these agricultural machines when they have to travel from one plot to work in another plot, they must necessarily be transported on roads and paths, therefore when non operative and in its travel configuration, the frames must be folded, until an acceptable transport width is reached.

To this end, there is a number of safety regulations requiring these agricultural machines to have a maximum width when travelling on roads, in order to allow the transit of other vehicles under safety conditions.

Examples of the known prior art are illustrated by the following documents:
  a) U.S. Pat. No. 5,113,956. This patent, already in public domain, anticipates the forward folding of the lateral frames of an agricultural machine hinged or articulated at the ends of a central frame.
  b) US Patent application 2005/0087350 A1. This published application teaches a planter with a fixed central frame and one or two articulated lateral frames at the respective ends of said central frame. The aforementioned document indicates the existence of a central frame (210a), to which the collapsible lateral frames (210b) articulate, pivoting forwardly rotating at the ends of (210a). The actuator hydraulic cylinders force the forward rotation of the lateral frames, which are linked to oblique fixed non-extensible braces having one of their ends articulated to each of said lateral frames, and the other end of each brace is linked to a telescopic portion of the tongue, usually perpendicular to the central frame. Said central telescopic tongue defines at its free end the towing attachment of the agricultural machine. That is, when folding the lateral frames, as the folding progresses, usually in a horizontal plane, said braces push forward a telescopic portion (520) of the central tongue, which emerges from the fixed portion of said tongue (530) integral with the central frame. This folding arrangement is common knowledge in the industry and is adopted by most manufacturers of agricultural machinery of this type. It is observed in the drawings that the rolling train or supporting wheel train is linked to the central frame, and is formed by one or two pairs of coaxially aligned wheels, usually placed on a same and unique axis. The seed and/or fertilizer containers are distributed over the various sections of the frames, generally supplied by gravity to the means depositing them on the soil. These deposition devices are also known in the art. This prior art construction further teaches the use of support wheels (140) placed at the free ends of the lateral frames on which said articulated lateral frames rests.
  c) Brazilian Utility Model application BR 20 2012 030225-5 U2.
    This published patent application, teaches several folding sections of the frames of a planter supported at all times on wheels. In fact, in US application 2005/0087350 A1 the folded lateral frames are linked to portions of the central tongue, which remains cantilevered with respect to the traction hitch, subjecting the whole structure to significant compound bending and torsion loads, while in this Brazilian application, the whole set is improved by always supporting the frames on wheels. On the other side, this BR 20 2012 030225-5 U2 application is partially anticipated in its general concept by the Brazilian patent PI 0001239-4 A, published on 2001.

PROBLEMS FOUND IN THE PREVIOUS ART CONSTRUCTIONS

One of the main problems found in the prior art constructions is that with the lateral frames folded for transport, these agricultural machines still presents a very wide front, generally in excess of 4 meters, which infringes the road safety rules placing in dire danger the rest of the vehicles travelling along the same roads.

Another of the problems found in some of the prior art is that the overall stability of the planter is precarious, due to the distribution of the containers or hoppers placed throughout the entire length of the frames, displacing its centre of gravity towards the sides, with the disadvantage that not always these containers distributed along the frames are uniformly emptied, introducing important imbalances affecting the stability and running of the agricultural machine, specially over uneven or rough grounds.

Last, it has been found that in the known prior art embodiments the arrangement of the wheels usually presents problems in the distribution of the mass of the machine, having their wheels aligned along a same axis.

OBJECTS OF THE PRESENT INVENTION

It is therefore object of this instant invention to provide a design of an agricultural machine offering a solution to each of the above mentioned problems with the necessary improvements over the prior art constructions.

It is another object of the invention an agricultural machine having means for closing the lateral frames decreasing, when folded, the total size of its width in a range of 3 meters to 3.90 meters, thus complying with the dimensions for road travel according to safety regulations.

It is also an object of the invention to place the wheels supporting the central frame distributed in pairs on two parallel axes, increasing the support base and stability of the machine.

Last, is also object of this instant invention an agricultural machine, such as a seeder, in which its width in its operative configuration (that is, with the lateral frames substantially aligned with the central frame) is at least double the length of the central frame when said lateral frames are folded and placed alongside de central tongue.

SUMMARY OF THIS INSTANT INVENTION

AGRICULTURAL MACHINES WITH IMPROVED FOLDABILITY OF ITS LATERAL FRAMES, which includes a central frame (9) and lateral frames (10, 10') articulated adjacent at each end thereof; the central frame (9) is linked perpendicularly to a central fixed (2) secured to said central frame (9) and a telescopic distal portion (2') able to be displaced axially with respect to said fixed tongue portion (2); the central frame (9) sits supported on wheels while the free ends of said lateral frames (10, 10') are supported on corresponding end wheels (7); each lateral frame (10, 10') is articulated to an end of a inextensible brace (5), while the other end of each brace is articulated at the same distance on the stretch of the telescopic tongue (2'), forming a deformable rhomboid kinematics; each lateral frame (10, 10') is subjected to a reciprocal angular displacement of opposite sign with respect to the central frame (9) from its extended working frame position substantially aligned with the central frame section, until it is folded against the sides of said tongue (2), configuring the travel folded position thereof, parallel to said tongue; at least the central frame and/or the lateral frames have seeds and/or fertilizers deposition devices (14, 14') provided by at least one container or hopper (4) carried by said agricultural machine and conducted from said container to said deposition devices, characterized by having corresponding arms (12) articulated by means of a first articulation (18) on one end of each arm at both sides of the stationary tongue (2) adjacent to its attachment to the central frame (9) and independently of the central frame, being said arms (12) coplanar to the central frame (9); each one of said arms (12) has its other end articulated by means of a fourth articulation (12a) to the adjacent end of the corresponding lateral frame (10, 10'), and between the ends of each of said arms (12) there is a further second articulation (16) on which the end of a corresponding hydraulic piston (15) is connected; each of said hydraulic pistons (15) is arranged obliquely on each side of the fixed tongue (2) and by means of a third articulation (17) the rod of each cylinder is connected to said stationary portion of the tongue (2) at a same distance thereof; the length of said arms (12) being such that in the unfolded machine condition (operative position), the lateral frames (10, 10') are adjacent and aligned to the ends of the central frame (9); in said deployed and operative position of the agricultural machine, said first pair of articulations (18) is placed between the third pair of articulations (17) and the second pair of articulations (16), being this second pair of articulations (16) placed closer to the central frame (9), while the fourth pair of articulations (12a) linking each arm (12) to its the lateral frame is placed at a greater distance from the central frame (9) with respect to said second articulations (16), but at a lesser distance in relation to said first articulations (18); said arms (12) when folding each of the lateral frames (10, 10') describes an arc of circumference of a magnitude greater than the distance from the central portion of the frame (9) to the wheels (31, 32) and means of suspension thereof and of their attachment to the central tongue; the telescopically displaceable tongue (2') is housed within said fixed portion (2) of the tongue, while said central section of the frame and fixed portion of said tongue defines an area within which it is placed the wheels train (31, 32) supporting said structure.

DETAILED DESCRIPTION OF THE ENCLOSED DRAWINGS

For purposes of providing a preferred embodiment of this instant invention, the following drawings showing same are attached, with the support of the description of this embodiment given below, while this construction should be interpreted as one of the many possible constructions of the invention, without assigning any limiting value to it, including within its scope of protection of the invention all the possible equivalent means to those illustrated; being the scope of the present invention determined by its first claim in the corresponding chapter of Claims.

Also, in the drawings, same references identifies equal or equivalent means.

FIG. 8a shows an enlarged detail of the arms and their angles of rotation;

Figure 1:
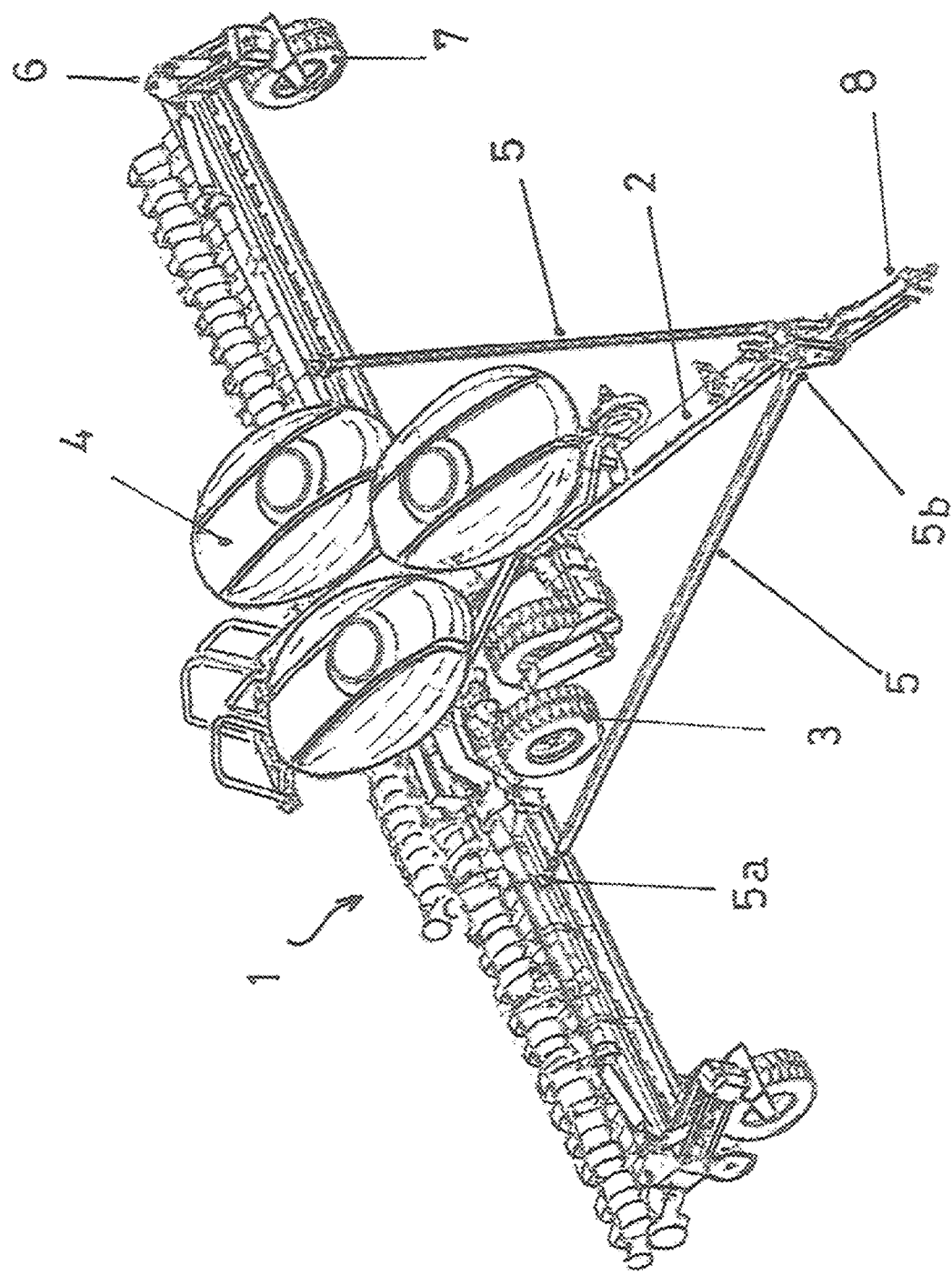
FIG. 1 is a schematic and generic top perspective view of an embodiment of the present invention, seen in its deployed working condition.

FIG. 1 shows an embodiment of the invention in a schematic and generalized form. This figure is for the sole purpose of exemplifying the construction of the invention applied to a seeding machine. The figure shows the existence of a frame in a deployed situation generically indicated with (1), that is, ready for its use in sowing and/or applying a fertilizer. In this figure a tongue (2) is perpendicular to the deployed frames generically indicated with (1), and the wheels train (3). The containers or hoppers (4) containing seed and/or fertilizer and/or agro-chemicals are arranged over the area in which projects the wheel train (3) and part of the tongue (2) project. It is noted that these containers or storage bins are of a large capacity volume and are not distributed over the entire frame, but being located in the vicinity of the centre of gravity of the wheel train (3). To each side of the frame (1) are linked articulately in (5a) respective inextensible braces (5) arranged obliquely concurrent to corresponding joints (5b) to a same height of the telescoping portion of tongue (2').

The fact of having a frame (1) with folding capacity supported on a generic wheel train, equipped with a tongue (2), braces (5) and extreme wheels (7) articulated in (6) to the ends of the lateral folding frames, and a towing end (8) on the free end of the tongue, are constructions known in the art.

The novelty of the present invention lies in the following items, which are detailed below with the help of FIGS. 2 to 10, namely, to be able to achieve the overall with of the agricultural machine in its folded condition within limits compatible with road regulations, and with an overall width less than 4 meters. The prior art machines have, folded, a drag front that exceeds 4 meters, because they do not achieve the folding provided by the construction of the present invention, while the seeding machine with the attributes of the present invention allows a working width (with its frames deployed in its working condition) greater than twice the folded width (machine folded for transport), such as a folded width less than 4 meters, achieving all this with a machine with up to 44 planting or seeding lines and a span of 8.4 to 9 meters wide when it is deployed.

Figure 2:
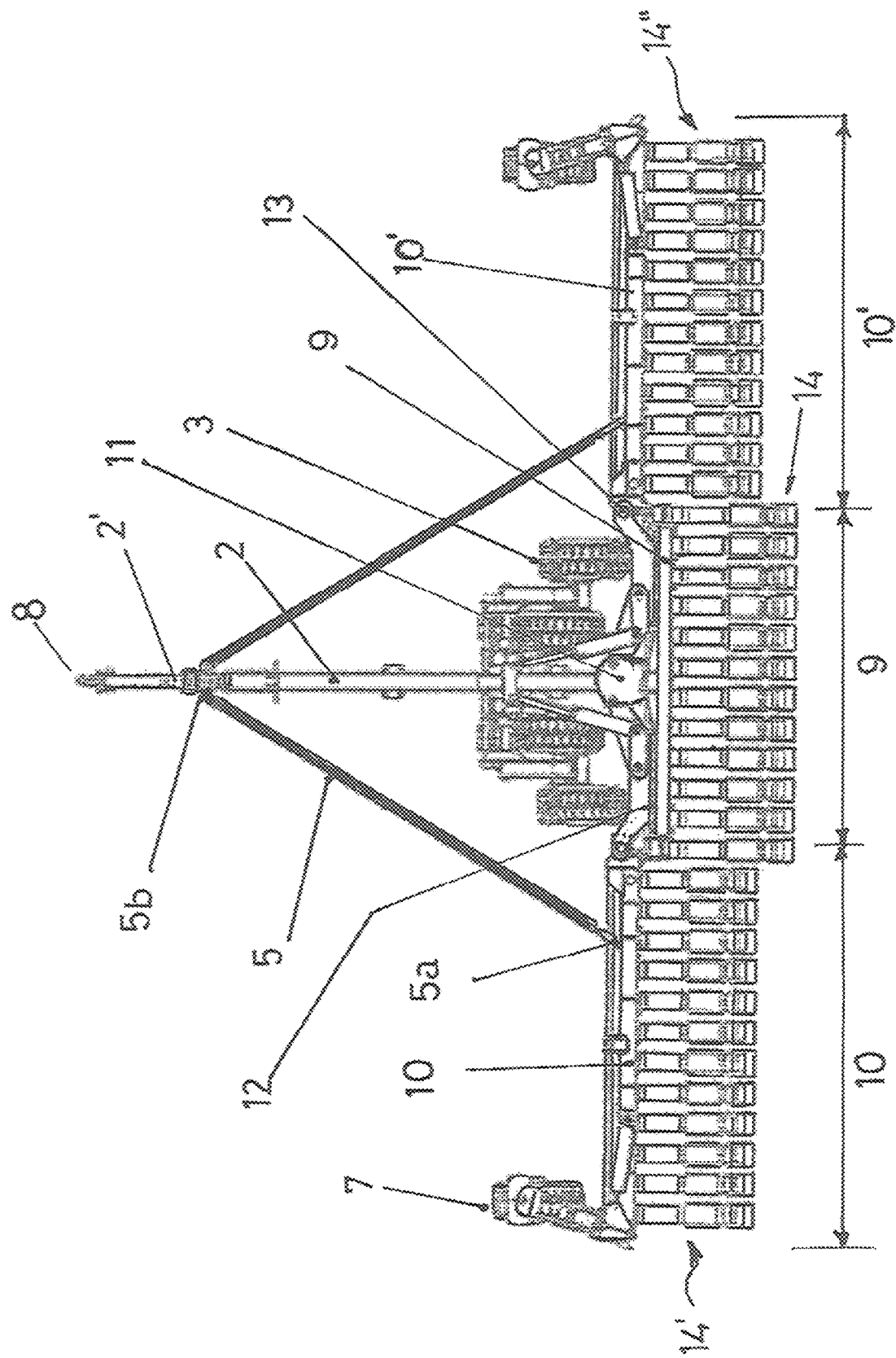
FIG. 2 is a simplified plan view of the machine of FIG. 1, seen in its deployed working condition.
Figure 3:
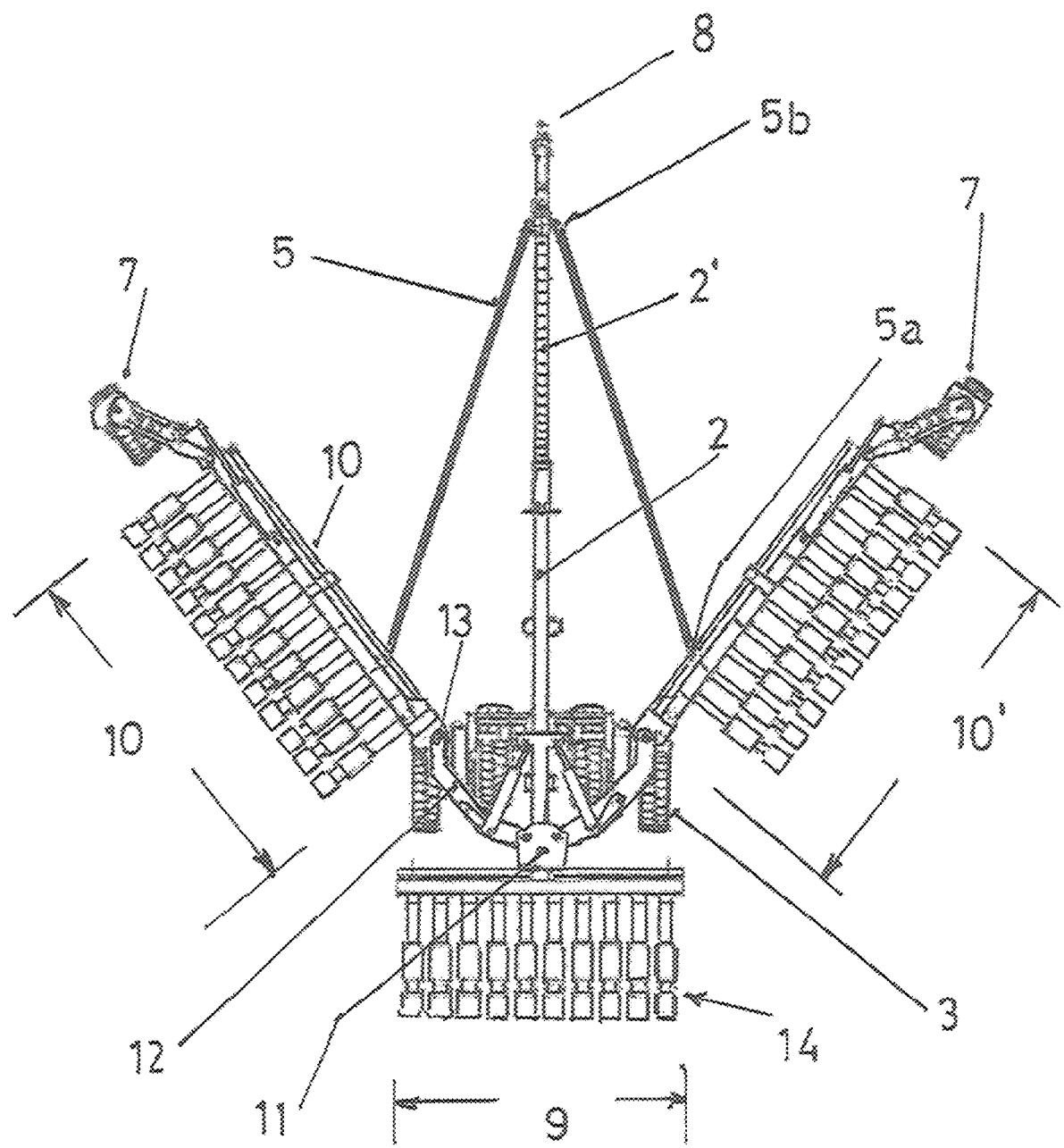
FIG. 3 is a plan view of the machine of FIG. 1, seen in its partially folded condition.
Figure 4:
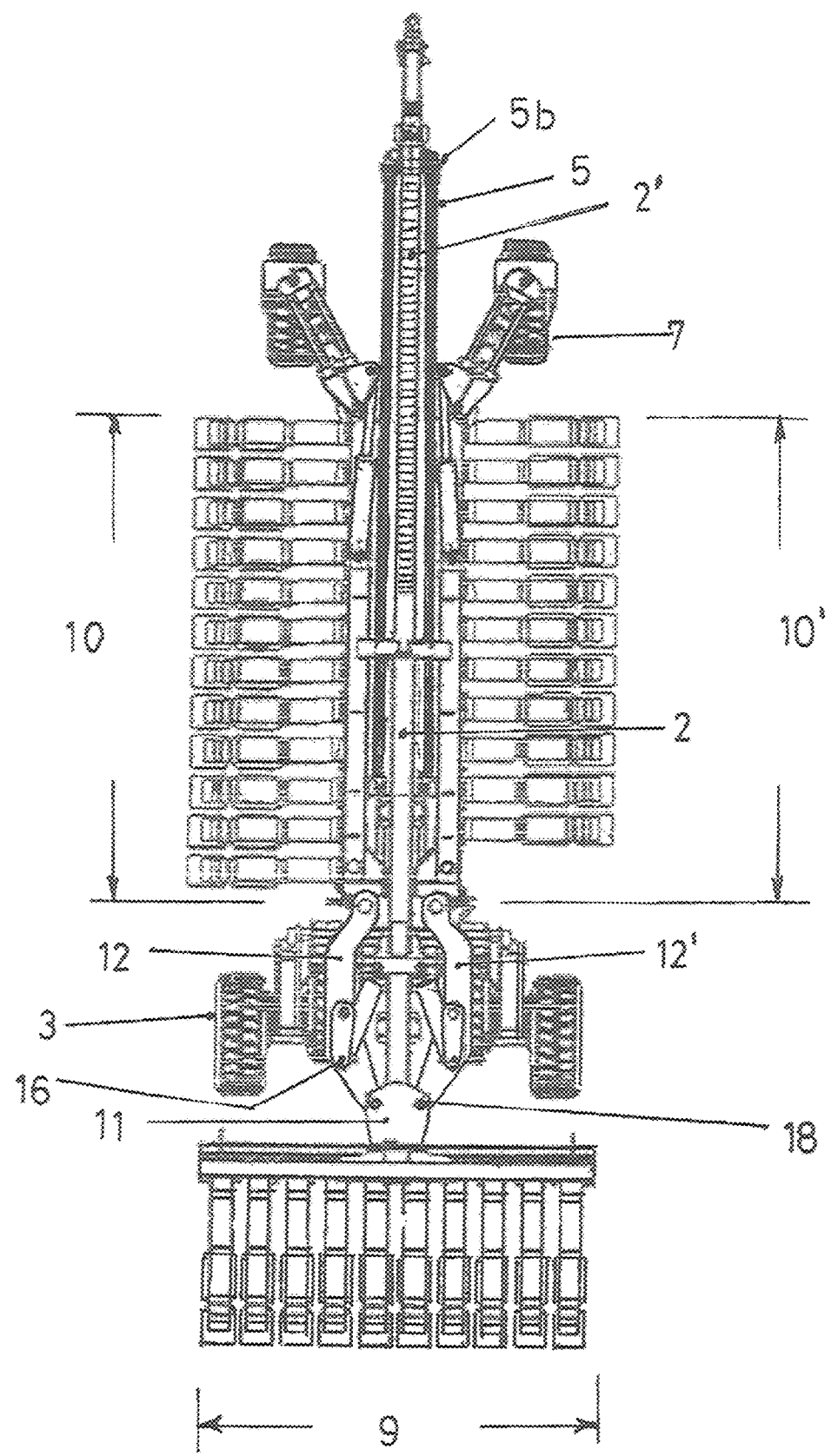
FIG. 4 is a plan view of the machine of FIG. 1, seen in its folded transport condition.

FIGS. 2 to 4 shows a top view of an embodiment of this instant invention as applied to a seeder/fertilizing machine, which in FIG. 2 is shown in its unfolded (working) position, that is, ready for agricultural use. In these figures and the successive ones, the containers (4) have been eliminated so as not to disturb said figures. FIG. 2 with its reference (2) indicates the portion of the fixed tongue while being (2') the portion of the tongue telescopically slideable outwards. In FIG. 2 the telescopic portion (2') is fully retracted within the section (2) of the fixed tongue. The frames of the planter have a central frame section (9) and two lateral frame sections, respectively (10, 10'). According to the present invention, and in contrast to the prior art, the fertilizer and seed deposition devices such as the illustrated sowing line (14) of the central frame (9) are directly linked to it, but the lateral frames (10, 10') are not directly linked to said central frame section (9). According to the present invention, the fixed tongue section (2) is connected perpendicular and in the axis of symmetry to the central frame section (9), for example by means of plates (11), being placed one lower and one upper on said tongue adjacent to its meeting with frame (9). On each side of said plates (see FIGS. 5, 6, 7 and 8) and between said pair of plates (11) articulates respectively an arm (12, 12') by means of a first articulation or joint (18) (see FIG. 3) substantially coplanar to the plates (11).

The lateral frames (10, 10') are articulated at opposite ends (13) of these arms (12, 12'): To said lateral frames is also articulated at (5a) braces (5), which in turn have their other end articulated at (5b) to a stretch of the telescopic extensible tongue (2'). In FIG. 2 it is possible to observe the relative dimensions representing the length of the frame sections (9, 10, 10') and the position of the end wheels (7). The sowing lines (14, 14', 14") are linked respectively to the central and lateral sections of frames (10, 10') and are displaceable along with said frames.

FIG. 3 shows the same arrangement of FIG. 2, with the lengths of lateral frames (10, 10') in the process of folding, and FIG. 4 shows the same arrangement, with the frames fully folded, in its travel or transport position.

Figure 5:
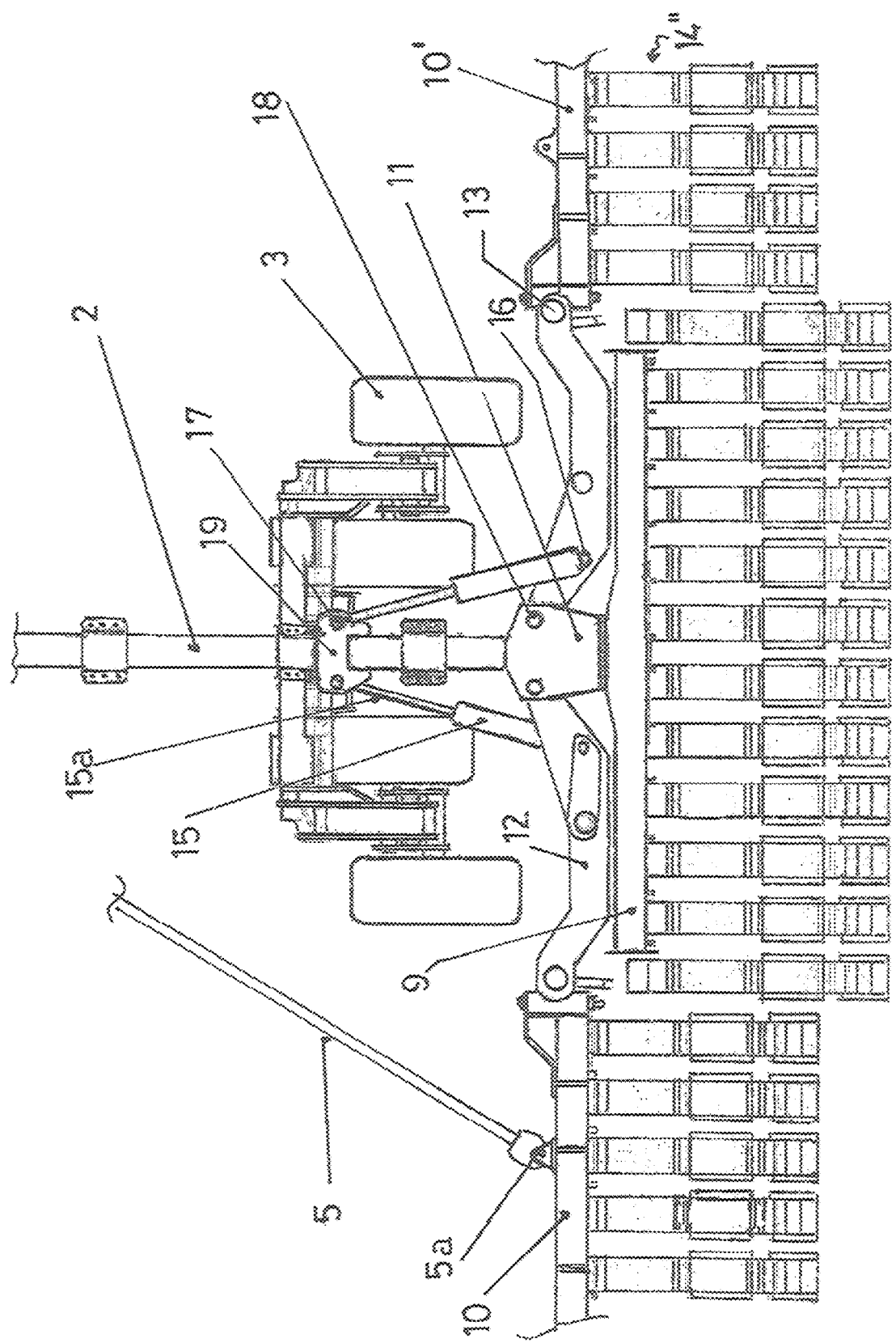
FIG. 5 is an enlarged view of FIG. 2.
Figure 6:
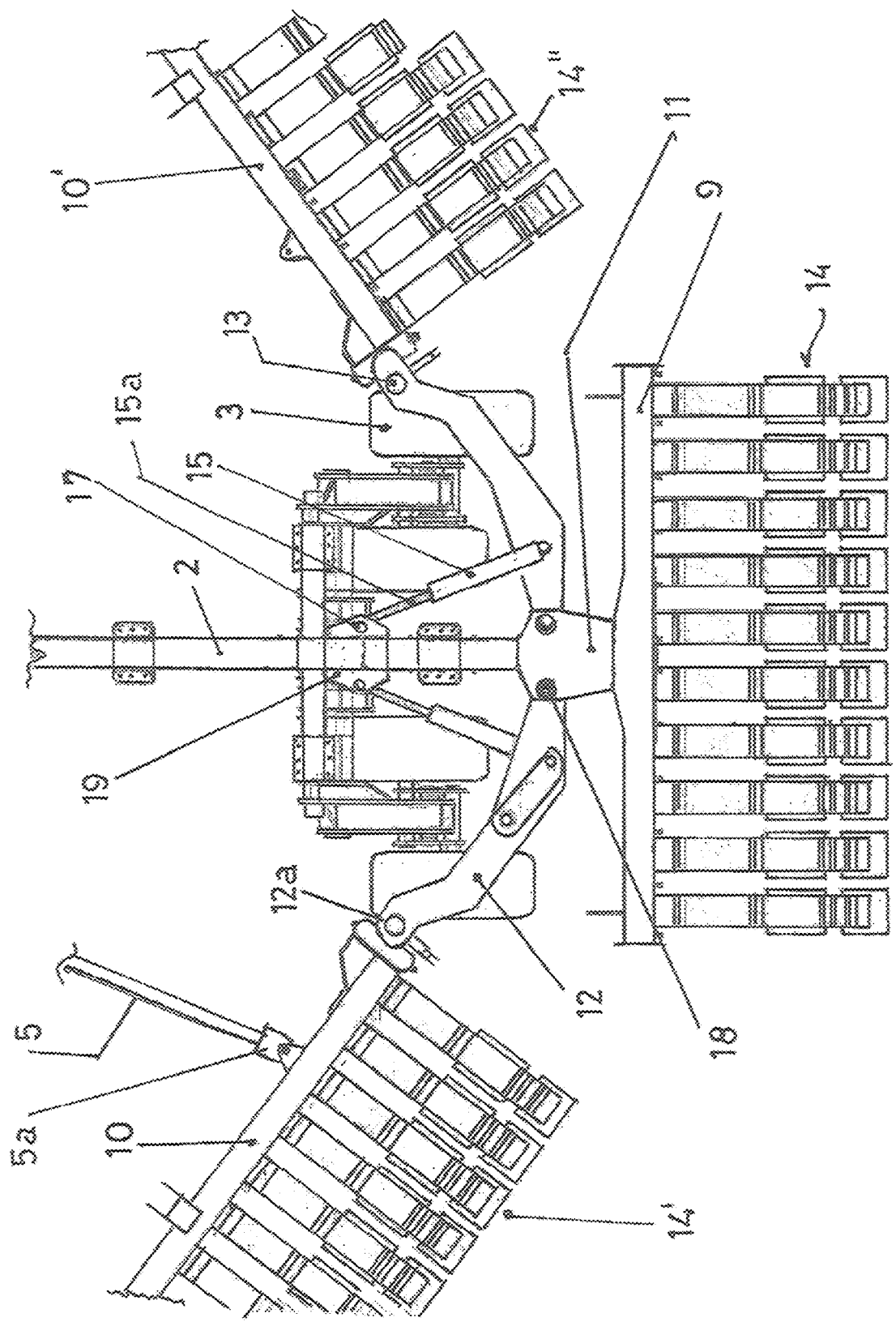
FIG. 6 is an enlarged view of FIG. 3.
Figure 7:
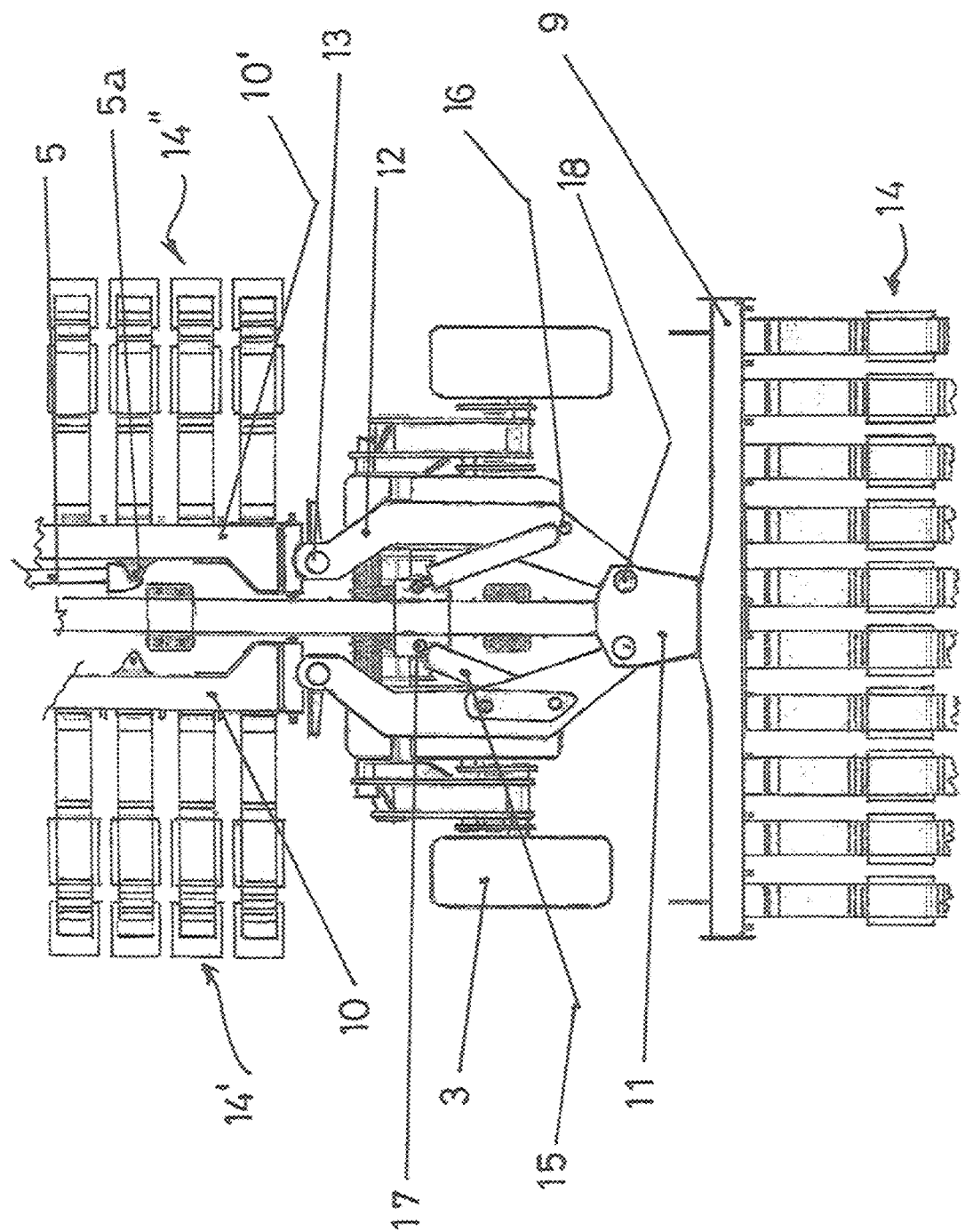
FIG. 7 is an enlarged view of FIG. 4.

The following FIGS. 5, 6 and 7 shows an enlarged detail of the previous FIGS. 2, 3 and 4, allowing to visualize the constructive characteristics of the present invention and its working. Reference (15) indicates the hydraulic cylinders articulated through second articulations (16) to the respective arms (12), while the cylinder rods (15a) are articulated to the fixed portion of tongue (2) by means of third articulations (17) on both sides of a plate (19), secured to (2) and place at a distance from (11). Obviously this arranged can be changed, and the rods can be articulated to the arms (12) while the piston body is articulated to tongue (2). Each arm (12, 12') is articulated by means of said first articulations (18) to plates (11), which in turn are linked to the to both the fixed tongue at its union with the central frame (9). As said, ideally there are two parallel and separate plates (11) between which arms (12) are articulated by first articulations (18) or joints, although this arrangement can vary, according to what is already known in the art, for example using a single plate (11).

FIGS. 5, 6, 7, 8 and 8a allows to observe that the arms in turn can be formed by two equal profiled flat plates, arranged one above the other and separated from each other, between which they are articulated at (16) the hydraulic cylinders (15). This last arrangement can also be replaced by arms (12) shaped as already mentioned, by a single plate. On the right side of these three figures the flat plate of the upper arm (12) has been eliminated, illustrating the articulation in (16) of said cylinders.

Figure 8:
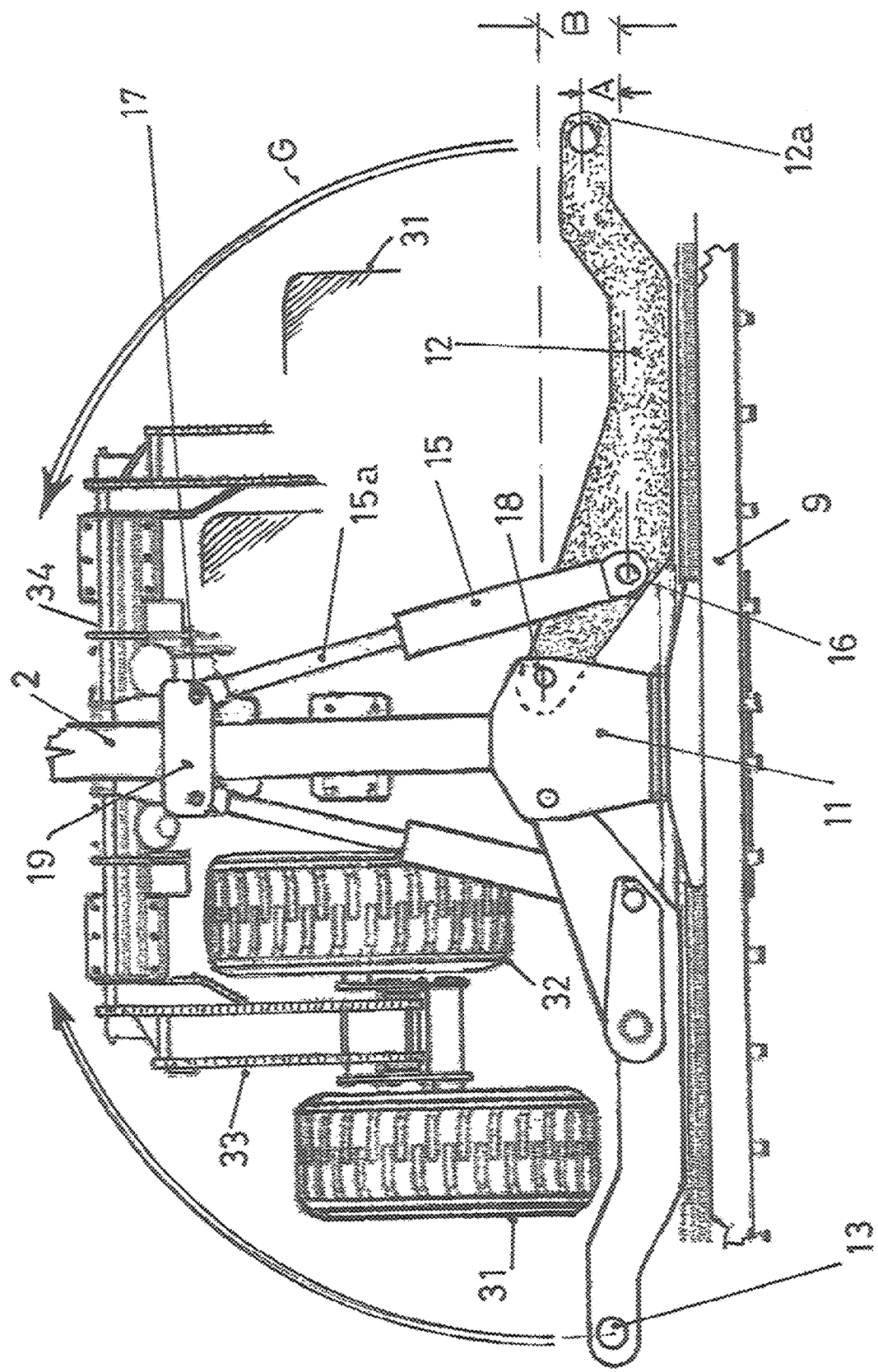
FIG. 8 illustrates the design conditions of the folding arms of the machine of the invention, in its preferred embodiment.

FIG. 8 also allows to observe the turning radius "G" of the ends (13) of the arms (12) while performing the folding thereof, and the particular design of the arrangement of the wheels train (3) allowing said rotation, with the relative location of the axes of rotation of the angularly displaceable arms.

Said wheel train (3), preferably presents a pair of external wheels (31) with its axis aligned parallel to the central frame (9) and displaced towards same. This pair of wheels (31) have a greater gauge in relation to a second pair internal wheels (32), placed between the external ones (31), having this second pair (32) a smaller gauge and they have their axis parallel to the axis of wheels (31) but displaced forward, arranged in pairs on each side of the tongue (2). Each pair of wheels (31, 32) on either side of said tongue are linked on each side of a rocker arm (33), which in turn is articulated to a transverse shaft (34) integral with the tongue (2). This assembly is provided with known dampening means, such as torsion arms, shock absorbers, etc. (not illustrated). In FIG. 8 it may be also noticed that the turning radius "G" of the arm (12) is allowed to traverse angularly without interference from said wheels assembly. It is thus noted the advantage of having rearwardly displaced external wheels (31) endowing them with a gauge practically equal to the length of the central frame (8) and the having a reduced gauge for the internal wheels (32), while placing them before the pair of wheels (31), and this allows the arms (12) to fold until they are parallel and adjacent to the tongue (2). (See FIG. 8a). This arrangement also achieves that the bearing train is of the traction type, that is, each rocker arm (33) is placed in front of the wheels, and at the same time, this design allows the transverse shaft (34) to be shorter than the maximum gauge given by wheels (31). This arrangement allows to increase the mass distribution of the machinery on the ground, and increase its stability, even over rough ground.

Regarding the relationship of the rotation axis of each arm (12, 12'), in FIG. 8 it is observed that the axis of rotation (18) of each arm (12, 12') with respect to the plate (11) is located farthest from the central frame (9) with regards to the point of application (16) of piston (15) on the arm (12). In effect, this second articulation (16) is arranged closest to said central frame (9), resulting in the distance "B" between (18, 16) being less than the distance "A" between the linking centre of the lateral frame (10, 10') to the arm (12) and the point of application of force (16). This arrangement allows reducing the length of the arm (12), while at the same time allowing the sowing lines of the central and lateral frames to be placed adjacent and uniformly separated in the unfolded or working position.

FIG. 8a shows further details of the arm (12) construction. In the same it is observed that said arm after its articulation in (18), projects in the same plane towards the central frame (9) until forming a concavity (12c), resulting in the point of engagement (12a) (fourth articulation) with the lateral frames (10, 10') at a greater distance (12d) from the central section of the central frame (9), which allows the rod (15a) of piston (15) to be attached by means of its articulation (third articulation 17) without problems against the plate (19), thus providing the angular displacement of piston (15) while folding or unfolding the lateral frames.

Figure 9:
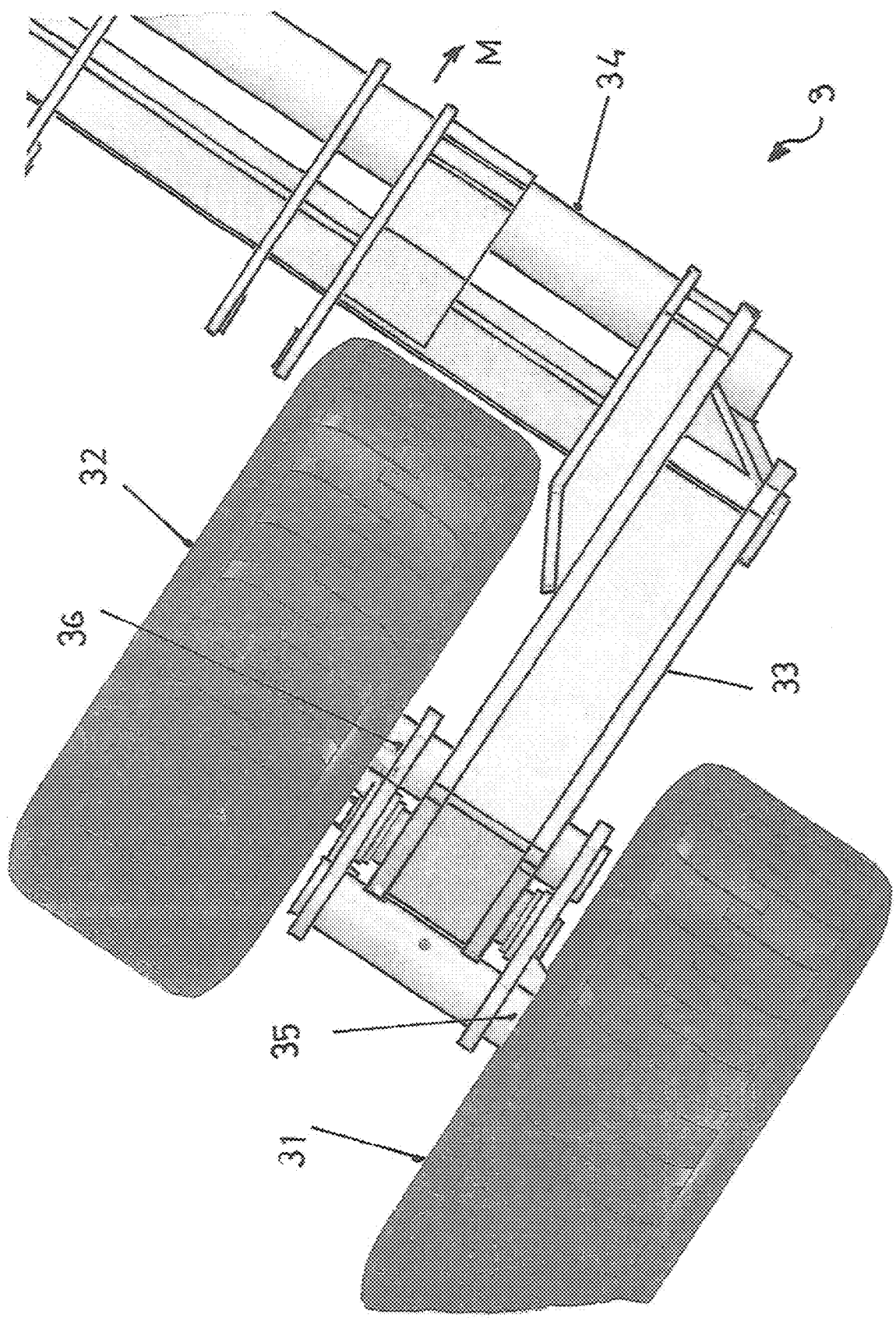
FIG. 9 shows an enlarged detail of the main set of supporting wheels, as applied to the machine of the invention.

FIG. 9 illustrates the preferred construction of the main supporting wheel train of the machine of this instant invention, in which with a single rocker (33) the wheels (31, 32) of the same side of the tongue (2) are linked in the arrangement already detailed, resulting in the cross shaft (34) arranged upstream according to the direction of travel "M", which it allows to act on the damping associated with each rocker (33) working as tractioned wheels, at the same time reducing the length of said cross shaft (34).

Figure 10:
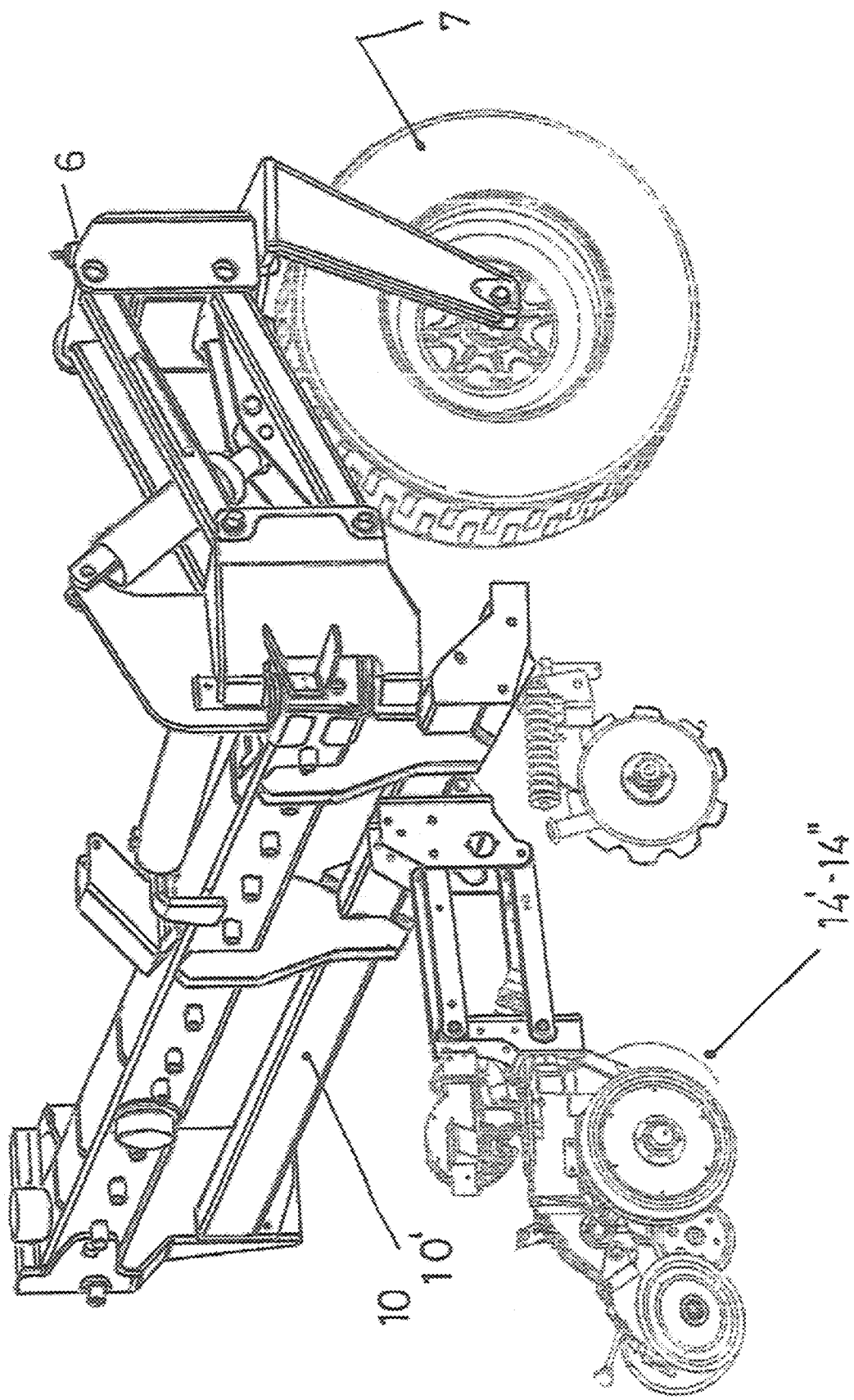
FIG. 10 is a partial perspective view of the supporting wheels placed at the end of each lateral frame.

Finally, FIG. 10 shows one of the possible constructions of the wheels (7) arranged at the end of each side of the lateral frames (10, 10'). It is observed that this wheel (7) turns freely on its vertical axis (6) and is supported on a generic damping grid known in the art, as this figure shows. The result of this wheel arrangement, although the same is already teached by, for instance, by the mentioned Brazilian patent, allows this agricultural machinery to achieve at all times and on any ground its clearance from said ground level, while during its folding and transport disposition the central and lateral frames remains constantly seated on its wheels (31, 32, 7), the latter being an important result of the present invention.

The invention claimed is:

1. An agricultural machine with improved foldability of its lateral frames, comprising a central frame (9) and lateral frames (10, 10') articulated adjacent at each end thereof, wherein the central frame is linked perpendicularly to a central fixed tongue (2) secured to said central frame and a telescopic tongue (2') able to be displaced axially with respect to said fixed tongue portion;

wherein the central frame sits supported on wheels while free ends of said lateral frames are supported on corresponding end wheels (7);

wherein each lateral frame is articulated to an end of an inextensible brace (5), while another end of each brace is articulated at the same distance on a stretch of the telescopic tongue (2');

wherein each lateral frame is subjected to a reciprocal angular displacement of opposite sign with respect to the central frame from its extended working frame position substantially aligned with the central frame section, until it is folded against the sides of said central fixed tongue, configuring the travel folded position thereof, parallel to said central fixed tongue;

wherein at least the central frame and/or the lateral frames have seeds and/or fertilizers deposition devices (14, 14') provided by at least one container or hopper (4) carried by said agricultural machine and conducted from said container to said deposition devices;

wherein the agricultural machine comprises corresponding arms (12) articulated by means of a first articulation (18) on one end of each arm at both sides of the fixed tongue (2) adjacent to its attachment to the central frame and independently of the central frame, being said arms (12) coplanar to the central frame;

wherein each one of said arms (12) has its other end articulated by means of a fourth articulation (12a) to the adjacent end of the corresponding lateral frame (10, 10'), and between the ends of each of said arms there is a further second articulation (16) on which the end of a corresponding hydraulic piston (15) is connected;

wherein each of said hydraulic pistons (15) is arranged obliquely on each side of the fixed tongue (2) and by means of a third articulation (17) the rod of each cylinder is connected to said stationary portion of the fixed tongue (2) at a same distance thereof;

wherein the length of said arms being such that in the unfolded machine condition (operative position), the lateral frames (10, 10') are adjacent and aligned to the ends of the central frame;

wherein in said deployed and operative position of the agricultural machine, said first pair of articulations (18) is placed between the third pair of articulations (17) and the second pair of articulations (16), being this second pair of articulations (16) placed closer to the central frame, while the fourth pair of articulations (12a) linking each arm (12) to its the lateral frame is placed at a greater distance from the central frame with respect to said second articulations (16), but at a lesser distance in relation to said first articulations (18);

wherein said arms (12) when folding each of the lateral frames describes an arc of circumference of a magnitude greater than the distance from the central portion of the frame to the wheels (31, 32) and means of suspension thereof and of their attachment to the central tongue; and wherein the telescopically displaceable tongue (2') is housed within said fixed portion (2) of the tongue, while said central section of the frame and fixed portion of said tongue defines an area within which it is placed the wheels train (31, 32) supporting said structure.

2. The agricultural machine of claim 1, wherein said arms (12), arranged coplanar and articulated to the plane formed by the central frame (9) and portion of fixed tongue (2), are formed by two equally profiled plates superimposed and separated from each other, said articulated plates being placed between two other plates (11) integral with the end of the fixed tongue (2) where it joins the central section (9) of frame;

and further wherein said pistons (15) are attached, respectively by means of said second articulation (16), between said two plates of the corresponding arm (12).

3. The agricultural machine of claim 1, wherein said wheel train (3) is determined by a first pair of rear wheels (31) with a first common axis parallel to the axis of the central frame (9), adjacent to said central frame and with a greater gauge than that of a second pair of wheels (32) arranged with their axes parallel to the first axis of the first pair of wheels (32) and arranged upstream in the direction of travel;

further wherein each wheel (31) and (32) are places at either sides of the fixed tongue (2), being said wheels on the same side linked with their axes to a common rocker (33), in turn linked to a transverse shaft (34) linked upstream to said tongue (2); and further wherein said machine comprises three containers or hoppers (4) all of which are placed on an area delimited by the central section of frame (9) and portion of fixed tongue (2) lance and linked to the machine, and in correspondence to the two area covered by said wheel train.

4. The agricultural machine of claim 2, wherein each arm (12), after its first articulation (18) to one of said plates (11), is projected in a plane towards the central frame (9) until forming a concavity (12c) determining that resulting articulated connection (12a) of the free end (13) of each arm (12) with the respective lateral frame (10, 10') is at a greater distance than the separation from the first articulation (16) to said central frame (9).

5. The agricultural machine of claim 1, wherein each of the wheels (7) arranged at the end of each lateral frame (10, 10') rotates freely about its vertical axis.

6. The agricultural machine of claim 1, wherein in the folded machine position, the overall width of said machine is less than 4 meters.

7. The agricultural machine of claim 1, wherein the body (15) of the hydraulic piston cylinder is linked to the respective arm (12) while its rod (15a) is hingedly linked to the telescopically displacing tongue portion (2').

8. The agricultural machine of claim 1, wherein a working width machine position is more than twice the width of the folded machine position.

9. An agricultural machine, comprising:
a central frame (9) comprising a first end and a second end, and comprising two or more wheels;
a first lateral frame (10) comprising first and second ends, wherein the first lateral frame is supported on said second end by an end wheel (7);
a second lateral frame (10') comprising first and second ends, wherein the second lateral frame is supported on said second end by an end wheel (7);
a central fixed tongue (2) secured to said central frame;
a telescopic tongue (2') configured to be displaced axially with respect to said fixed tongue portion, wherein the telescopic tongue is configured to be reversibly housed within said central fixed tongue;
a first extensible brace (5) articulated at a first end to the first lateral frame, and articulated at a second end to a portion of the telescopic tongue;
a second extensible brace (5) articulated at a first end to the second lateral frame, and articulated at a second end to a portion of the telescopic tongue;
a hopper (14) configured to carry seeds and/or fertilizer for deposition;
one or more seed and/or fertilizer deposition devices (14, 14') configured to receive seeds and/or fertilizer from the hopper for distribution;
a first corresponding arm (12) connected by a first articulation (18) to a first end to a first side of the central fixed tongue, and connected by a second articulation (12a) to a second end to the first end of the first lateral frame;
a second corresponding arm (12) connected by a first articulation (18) to a first end to a second side of the central fixed tongue, and connected by a second articulation (12a) to a second end to the first end of the second lateral frame;
a first hydraulic piston (15) connected at a first end to the first corresponding arm via a third articulation (16), wherein said first hydraulic piston is connected via a second end to said central fixed tongue via a fourth articulation (17); and
a second hydraulic piston (15) connected via a first end to the second corresponding arm via a third articulation (16), wherein said second hydraulic piston is connected via a second end to said central fixed tongue via a fourth articulation (17).

10. The agricultural machine of claim 9, wherein said machine is reversibly switchable between an unfolded operative position and a folded storage position.

11. The agricultural machine of claim 10, wherein said first and second corresponding arms comprise a length configured such that in said unfolded operative position, the first lateral frame (10) is adjacent and aligned to the first end of the central frame, and the second lateral frame (10') adjacent and aligned to the second end of the central frame.

12. The agricultural machine of claim 11, wherein when said agricultural machine is in said unfolded operative position, the first articulation (18) of each corresponding arm is located between the third articulation (16) and the fourth articulation (17).

* * * * *